United States Patent
Wang et al.

(10) Patent No.: US 11,030,444 B2
(45) Date of Patent: Jun. 8, 2021

(54) METHOD FOR DETECTING PEDESTRIANS IN IMAGE BY USING GAUSSIAN PENALTY

(71) Applicant: Peking University Shenzhen Graduate School, Shenzhen (CN)

(72) Inventors: Wenmin Wang, Shenzhen (CN); Peilei Dong, Shenzhen (CN); Mengdi Fan, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 34 days.

(21) Appl. No.: 16/621,385

(22) PCT Filed: Nov. 24, 2017

(86) PCT No.: PCT/CN2017/112782
§ 371 (c)(1),
(2) Date: Dec. 11, 2019

(87) PCT Pub. No.: WO2018/233205
PCT Pub. Date: Dec. 27, 2018

(65) Prior Publication Data
US 2020/0160048 A1    May 21, 2020

(30) Foreign Application Priority Data

Jun. 21, 2017    (CN) .......................... 201710474582.0

(51) Int. Cl.
*G06K 9/00* (2006.01)
*G06T 7/70* (2017.01)
(Continued)

(52) U.S. Cl.
CPC ....... *G06K 9/00369* (2013.01); *G06K 9/6256* (2013.01); *G06N 3/08* (2013.01);
(Continued)

(58) Field of Classification Search
None
See application file for complete search history.

(56) References Cited

U.S. PATENT DOCUMENTS

2017/0147905 A1*  5/2017  Huang ................. G06K 9/6232
2017/0316285 A1* 11/2017  Ahmed ................ G06K 9/6223
2018/0165813 A1*  6/2018  Mai .................... G06K 9/00771

* cited by examiner

*Primary Examiner* — Leon Flores
(74) *Attorney, Agent, or Firm* — SV Patent Service

(57) ABSTRACT

Disclosed is a method for detecting pedestrians in an image by using Gaussian penalty. Initial pedestrian boundary box is screened using a Gaussian penalty, to improve the pedestrian detection performance, especially sheltered pedestrians in an image. The method includes acquiring a training data set, a test data set and pedestrian labels of a pedestrian detection image; using the training data set for training to obtain a detection model by using a pedestrian detection method, and acquiring initial pedestrian boundary box and confidence degrees and coordinates thereof; performing Gaussian penalty on the confidence degrees of the pedestrian boundary box, to obtain confidence degree of the pedestrian boundary box after the penalty; and obtaining final pedestrian boundary boxes by screening the pedestrian boundary boxes. Thus, repeated boundary boxes of a single pedestrian are removed while reserving boundary boxes of sheltered pedestrians, thereby realizing the detection of the pedestrians in an image.

5 Claims, 3 Drawing Sheets

(51) Int. Cl.
*G06K 9/62* (2006.01)
*G06N 3/08* (2006.01)
(52) U.S. Cl.
CPC ...... *G06T 7/70* (2017.01); *G06T 2207/20081* (2013.01); *G06T 2207/30196* (2013.01); *G06T 2210/12* (2013.01)

METHOD FOR DETECTING PEDESTRIANS IN IMAGE BY USING GAUSSIAN PENALTY

TECHNICAL FIELD

The invention relates to the field of information technology, and relates to technologies such as computer vision and pattern recognition, particularly, a method for screening a pedestrian boundary box by using a Gaussian penalty to detect a pedestrian in an image.

BACKGROUND OF THE INVENTION

Pedestrian detection determines whether a pedestrian appears in the input image or video and determines its location. In recent years, computer vision technology has been widely used in the field of intelligent driving, intelligent video surveillance and robotics with its rapid development. As an active measure to ensure the safety of cars and pedestrians, pedestrian detection has the significance and practical value of improving driving safety and ensuring the safety of pedestrians' lives and property. Pedestrian detection technology occupies an important position in the field of computer vision.

Due to mutual sheltering of pedestrians or sheltering between pedestrians and other objects, the sheltered pedestrians have only partial information in images or videos. One of the main challenges faced by pedestrian detection now is sheltered pedestrians. The current mainstream method first detects enough boundary boxes in an image and generates a confidence degree for each boundary box. The obtained initial pedestrian boundary box is then further screened to obtain the final pedestrian boundary boxes. The repeated boundary box will be deleted directly according to the strategy of non-maximum value suppression based on the confidence degree and the overlap degree in the general screening method. However, this screening method fails to handle sheltered pedestrians. In densely populated areas, the boundary boxes of sheltered pedestrians are also removed during the direct deletion of multiple boundary boxes due to the mutual sheltering of pedestrians. This makes the detection of sheltered pedestrians not satisfying.

SUMMARY OF THE INVENTION

To overcome the above deficiencies of prior art, the present invention provides a boundary box screening method by using Gaussian penalty, so as to improve the detection performance with respect to the pedestrians, especially sheltered pedestrians, in an image.

The technical scheme proposed in the present invention is directed to a method for detecting pedestrians in an image by using Gaussian penalty. In the process of detecting pedestrians, obtained initial pedestrian boundary boxes are screened by using a Gaussian penalty, so as to improve the detection performance with respect to the pedestrians, especially sheltered pedestrians, in an image. In one general aspect, the method includes:

Step 1) acquiring a training data set, a test data set and pedestrian labels;

The training data set and the test data set are respectively obtained from the pedestrian data set (Caltech) disclosed by the California Institute of Technology. The training samples or the test samples are marked by pedestrian labels, and the method of labeling is using a rectangular box to represent the position of the pedestrian, and the rectangular box is represented by the coordinates of the upper left and lower right corners in the image. That is coordinates of rectangular box in the upper left and lower right corners in the image are used to represent the position of the pedestrian in the image.

Step 2) training the model, detecting, and acquiring initial pedestrian boundary box, confidence degrees and coordinates thereof;

The training data set is used for training to obtain a detection model by using a pedestrian detection method (existing methods such as Faster RCNN). The detection model is used to classify the position of pedestrians on the test data set, and acquire initial pedestrian boundary box, confidence degrees and coordinates thereof; and Step 3) performing Gaussian penalty on the confidence degrees of the pedestrian boundary box, and obtaining final pedestrian boundary boxes by screening the pedestrian boundary boxes, thereby realizing the detection of the pedestrians in an image; comprising the steps of:

Step 31) classifying the initial pedestrian boundary box according to the overlap degree between the boundary boxes;

Specifically, the initial pedestrian boundary boxes of the present invention are classified as following three categories: no overlap between the pedestrian boundary boxes, a single pedestrian boundary box, and boundary boxes between sheltered pedestrians.

Step 32) performing Gaussian penalty on the confidence degree of the pedestrian boundary box for different kinds of initial pedestrian boundary boxes, so as to obtain confidence degree of the pedestrian boundary box after penalty; thus, the aim of removing repeated boundary boxes of a single pedestrian while reserving boundary boxes of sheltered pedestrians is achieved; specifically:

For each image, sort the boundary boxes according to the confidence degree, and select the boundary box M with the highest confidence degree;

Calculating the overlap ratio $IoU(M, bbox_i)$ of each of the other boundary boxes $bbox_i$ to boundary box M by Equation 1:

$$IoU(M, bbox_i) = \frac{\text{area}(M \cap bbox_i)}{\text{area}(M \cup bbox_i)}, \quad (1)$$

in which $\text{area}(M \cap bbox_i)$ is the intersection of boundary box $bbox_i$ and M, $\text{area}(M \cup bbox_i)$ is the union of boundary box $bbox_i$ and M;

The confidence degree of the boundary box is penalized by Equation 3:

$$score_i = score_i * e^{\frac{-IoU(M, bbox_i)^2}{\sigma}}, \quad (3)$$

in which e is the natural logarithm, $\sigma$ is the variance; $score_i$ is the confidence degree of boundary box $bbox_i$ after penalty; and $IoU(M, bbox_i)$ is the overlap degree (ratio) of boundary box $bbox_i$ to M; and Step 33) setting a confidence degree threshold, and taking the pedestrian boundary box with a confidence degree after penalty greater than the set confidence degree threshold (e.g. 0.5) as a final detection result of the image; and thereby realizing the detection of the pedestrians in an image.

The pedestrian boundary boxes are divided into three categories by the screening method in the present invention. The first is that there is no overlap between the pedestrian boundary boxes, as shown in FIG. 1. The second is a single pedestrian boundary box. In this case, the overlap degree between the boundary boxes is higher and the confidence degree is high, as shown in FIG. 2. The third is the boundary boxes of sheltered pedestrians. Since the sheltered pedestrian area is not completely overlapping, the overlap degree is lower than the second category. Based on these three cases, the confidence degree of boundary boxes is penalized to varying degrees. The penalty method is as follows: If there is no overlapping area, the confidence degree for the boundary box is not penalized; for boundary boxes with higher overlap degree, the confidence degree is greatly penalized; and for the boundary box with lower overlap degree, the confidence degree is less penalized. Finally, the pedestrian boundary box with a confidence degree higher than 0.5 is reserved as the final detection result for each image.

Compared with the prior art, the beneficial effects of the present invention are as follows: the present invention provides a boundary box screening method using Gaussian penalty. After obtaining the initial pedestrian boundary box, the confidence degree of the boundary box is penalized according to the overlap degree between the boundary boxes. For pedestrians who are completely unsheltered, the original boundary box is retained. A large confidence degree penalty is imposed on the repeated boundary box of a single pedestrian, thereby removing multiple boundary boxes and repeatedly detecting the same pedestrian. A lower confidence degree penalty is imposed on the boundary boxes of sheltered pedestrians, thereby preserving the boundary box of the possibly sheltered pedestrian. Experiments show that this invention can significantly reduce the miss rate of pedestrian detection, and improve the detection effect of sheltered pedestrians without increasing the computational complexity. The present invention achieves a lower missed detection rate.

DETAILED DESCRIPTION OF THE INVENTION

The present invention will become apparent from the following detailed description of embodiments and from the accompanying drawings, but not limited to the scope of the invention in any way.

The present invention provides a boundary box screening method using Gaussian penalty. After obtaining the initial pedestrian boundary box, the confidence degree of the boundary box is penalized according to the overlap degree between the boundary boxes; and the present invention can significantly reduce the miss rate of pedestrian and improve the detection effect of sheltered pedestrians without increasing the computation complexity.

Figure 1:
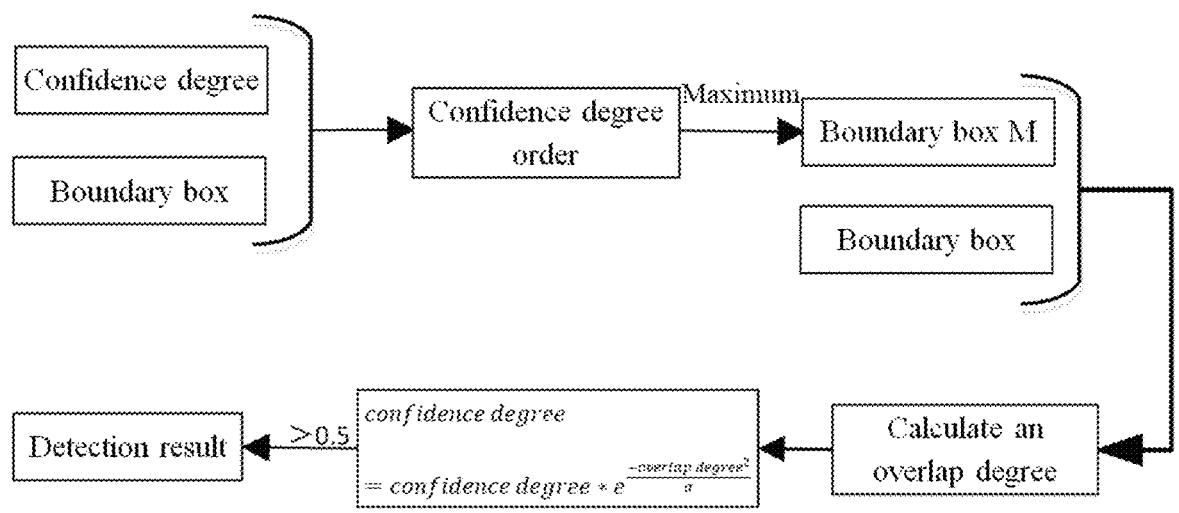
FIG. 1 is a flow chart of pedestrian boundary box screening method proposed in accordance with some embodiments of the present invention, wherein each pedestrian boundary box has a corresponding confidence degree; first, the boundary boxes are sorted according to the confidence degree, and the boundary box M with the largest confidence degree is obtained; then the overlap degree of other boundary boxes with M is calculated, and the confidence degree of the boundary box is penalized according to the overlapping degree; and finally, the boundary box whose confidence degree is higher than the threshold (e.g., 0.5) is selected as the final detection result.

FIG. 1 is a flow chart of pedestrian boundary box screening method proposed in the present invention; where each pedestrian boundary box has a corresponding confidence degree; first, the boundary boxes are sorted according to the confidence degree, and the boundary box M with the highest confidence degree is obtained; then the overlap degree of other boundary boxes with M is calculated, and the confidence degree of the boundary box is penalized according to the overlapping degree; and finally, the boundary box whose confidence degree is higher than the threshold (e.g., 0.5) is selected as the final detection result. The implementation steps of the present invention are specifically as follows:

I. Training the Detection Model and Detecting the Obtained Initial Boundary Box;

Step 1) training the detection model;

The detection model may select any one of existing methods such as Histogram of Oriented Gradient and Faster Region-based Convolutional Neural Network. The present invention takes the detection model Faster RCNN (Faster Region-based convolutional neural network) proposed in the literature [1] (S. Ren, K. He, R. Girshick, and J. Sun, "Faster R-CNN: Towards Real-Time Object Detection with Region Proposal Networks", TPAMI (2016)) as an example to obtain a pedestrian detection model through training.

Figure 2:
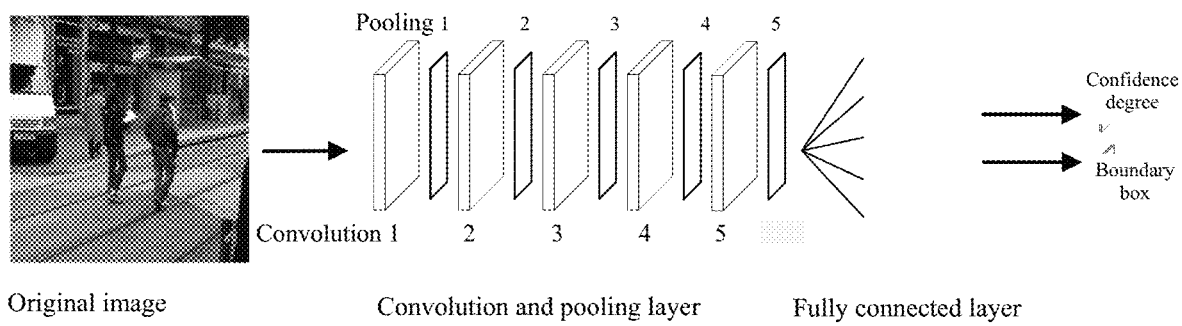
FIG. 2 is a schematic diagram for performing pedestrian boundary box screening using the Faster RCNN network structure in accordance with some embodiments of the present invention, wherein the entire Faster RCNN network is divided into three parts: input layer, middle layer and output layer; the middle layer includes convolution layer, pooling layer and fully connected layer; the network takes the original image as input, obtaining the feature of the image through convolution, pooling and full connection, and outputting the category information and the location information of the classification; and the output layer includes a classification layer and a location layer, the classification layer outputs category, and the location layer outputs location information.

FIG. 2 shows the neural network architecture of Faster RCNN. The present invention uses the training image of the Caltech data set to fine tune the fully connected layer of Faster RCNN network. In pedestrian detection, two categories are set: background class and pedestrian class. During the training, the training image and the ground-truth label are input into the neural network. The difference between the detection and labeling of the current model is fed back to the network model using the back propagation algorithm, and the parameters of the network model are adjusted; and when multi iterations are completed over the entire training set, the pedestrian's detection model is obtained.

Step 2) on the test image of the Caltech data set, using the trained pedestrian detection model to detect the obtained initial boundary box.

The test image is entered into the test model. Detect if any pedestrian is included in each image. If a pedestrian is included, the coordinate information $(x_1, y_1, x_2, y_2)$ and confidence degree (score) of the boundary box output from the network are retained after the classification and the positioning of the detection mode. Where $(x_1, y_1)$ is the coordinate of the upper left corner of the boundary box, and $(x_2, y_2)$ is the coordinate of the upper right corner of the boundary box. The top 300 boundary boxes with higher confidence degree are chosen as the initial boundary box for each image.

II. Screening of Boundary Box

Due to the limitation of ability to detect model classification, the classification model around a pedestrian in the obtained initial boundary box will locate dense multiple boundary boxes with high overlap degree and high confidence degree. The commonly used screening method is to first select the boundary box M with the highest confidence degree for each image, and calculate the overlap degree (ratio) IoU of $bbox_i$ to M for each of the other boundary boxes. The calculation method is as shown in Equation 1:

$$IoU(M, bbox_i) = \frac{\text{area}(M \cap bbox_i)}{\text{area}(M \cup bbox_i)}, \quad (1)$$

in which area($M \cap bbox_i$) is the intersection of boundary box $bbox_i$ and M, area($M \cup bbox_i$) is the union of boundary box $bbox_i$ and M.

When the overlap degree with the boundary box M is higher than the threshold thr, the boundary box $bbox_i$ and boundary box M are considered to be the same pedestrian area, so the boundary box $bbox_i$ is deleted. The deletion method is to set the confidence degree of the boundary box $bbox_i$ 的 as 0, as shown in Equation 12:

$$score_i = \begin{cases} 0, & IoU(M, bbox_i) \geq thr \\ score_i, & IoU(M, bbox_i) < thr \end{cases}, \quad (2)$$

in which $score_i$ is the confidence degree of boundary box $bbox_i$, obtained by the detection model.

Figure 4:
FIG. 4 is a schematic diagram of a pedestrian boundary box obtained by repeated detection of a single pedestrian in accordance with some embodiments of the present invention.

The repeated boundary box of a single pedestrian is removed by using the screening method as shown in the FIG. 4. However, in a pedestrian-intensive area, the pedestrians are sheltered by each other. For the sheltered pedestrian lacks part of the information, the confidence degree of the boundary box of the sheltered pedestrian is lower than that of boundary boxes of other pedestrians in general. As shown in FIG. 4, the confidence degree of the black box is greater than that of the gray box, and the gray box has large overlap with the black box. At this point, the gray boundary box will be deleted according to the above screening method, thereby causing the missed detection of the sheltered pedestrian.

Figure 3:
FIG. 3 shows the pedestrian with no overlapping area at all in accordance with some embodiments of the present invention.
Figure 5:
FIG. 5 is a schematic diagram of detecting a boundary box of sheltered pedestrians in the embodiment of the present invention. Whether the above-mentioned pedestrians have sheltered or overlap area or not refers to the relationship of pedestrians with black and gray boundary boxes in the image.

The pedestrian boundary boxes are divided into three categories by the screening method in the present invention. The first is that there is no overlap between the pedestrian boundary boxes, as shown in FIG. 3. The second is a single pedestrian boundary box. In this case, the overlap degree between the boundary boxes is higher and the confidence degree is high, as shown in FIG. 4. The third is the boundary boxes of sheltered pedestrians. Since the sheltered pedestrian area is not completely overlapping, the overlap degree is lower than the second case, as shown in FIG. 5. Based on these three cases, the confidence degree of the boundary boxes is penalized according to the overlapping degree. The penalty method is as follows: If there is no overlapping area, the confidence degree for the boundary box is not penalized; for boundary boxes with high overlap degree, the confidence degree is greatly penalized; and for the boundary box with low overlap degree, the confidence degree is less penalized. Thus, the aim of removing repeated boundary boxes of a single pedestrian while reserving boundary boxes of sheltered pedestrians is achieved.

Specifically, the screening process of the boundary box comprises the following steps:

Step 1: for each image, first sorting the boundary boxes according to the confidence degree, and selecting the boundary box M with the highest confidence degree.

Step 2: calculating the overlap ratio IoU of any other boundary box $bbox_i$ to M. by Equation 1; and Step 3: imposing confidence degree penalties on each boundary box. The penalty for confidence degree is expressed as:

$$S_i = score_i * e^{\frac{-IoU(M, bbox_i)^2}{\sigma}}, \quad (3)$$

in which e is the natural logarithm, $\sigma$ is the variance; $score_1$ is the confidence degree of initial boundary box; $S_i$ is the confidence degree of boundary box $bbox_i$ after penalty; and IoU(M, $bbox_i$) is the overlap degree (ratio) of boundary box $bbox_i$ to M, calculated by Equation 1.

Finally, the penalty formula (Equation (3)) is used to update the confidence degree of the initial boundary box of each image, and the boundary box with the updated confidence degree higher than the set threshold (e.g. 0.5) is used as the final detection result.

Table 1 gives the pedestrian detection effect after using the present invention on the Caltech data set compared with the existing methods. The existing methods in the first nine items in Table 1 correspond to the methods described in the following literatures [2] to [10]:

[2] Paul Viola, Michael J Jones, and Daniel Snow. 2005. Detecting pedestrians using patterns of motion and appearance, International Journal of Computer Vision 63, 2 (2005), 153-161.

[3] Pierre Sermanet, Koray Kavukcuoglu, Soumith Chintala, and Yann LeCun. 2013. Pedestrian detection with unsupervised multistage feature learning, Computer Vision and Pattern Recognition. IEEE, 3626-3633.

[4] Navneet Dalal and Bill Triggs. 2005. Histograms of oriented gradients for human detection, in Computer Vision and Pattern Recognition. IEEE, 886-893.

[5] Xiaoyu Wang, Tony X Han, and Shuicheng Yan. 2009. An HOGLBP human detector with partial occlusion handling, International Conference on Computer Vision. 32-39.

[6] Piotr Doll'ar, Serge J Belongie, and Pietro Perona. 2010. TheFastest Pedestrian Detector in the West, in British Machine Vision Conference, Vol. 2. Citeseer, 7.

[7] Piotr Doll'ar, Zhuowen Tu, Pietro Perona, and Serge Belongie. 2009. Integral channel features, British Machine Vision Conference.

[8] Piotr Doll'ar, Ron Appel, Serge Belongie, and Pietro Perona. 2014. Fast feature pyramids for object detection, IEEE transactions on pattern analysis and machine intelligence 36, 8 (2014), 1532-1545.

[9] Wanli Ouyang, Xingyu Zeng, and Xiaogang Wang. 2013. Modeling mutual visibility relationship in pedestrian detection, Computer Vision and Pattern Recognition. IEEE, 3222-3229.

[10] Ping Luo, Yonglong Tian, Xiaogang Wang, and Xiaoou Tang. 2014. Switchable deep network for pedestrian detection, Computer Vision and Pattern Recognition. IEEE, 899-906.

In Table 1, the detection effect is measured by the average log miss rate-fppi (false positive per image), where miss rate is the miss rate and fppi is the false detection rate of each frame of image. The lower the miss rate-fppi value is, the better the detection result is.

TABLE 1

Detection results on the Caltech dataset

| Detection method | Detection effect (miss rate-fppi) |
|---|---|
| VJ (Literature [2]) | 0.95 |
| ConvNet (Literature [3]) | 0.77 |
| HOG (Literature [4]) | 0.68 |
| HOGLBP (Literature [5]) | 0.68 |
| FPDW (Literature [6]) | 0.57 |
| ChnFtrs (Literature [7]) | 0.56 |
| ACF (Literature [8]) | 0.51 |
| DBN-Mut (Literature [9]) | 0.48 |
| SDN (Literature [10]) | 0.38 |
| Faster RCNN (Literature [1]) | 0.27 |
| Present invention method | 0.24 |

As can be seen in the table, the pedestrian detection effect using the method of the present invention achieves the lowest miss rate-fppi value compared to other methods. The miss rate is reduced by 3% compared to the original method using the Faster RCNN model and the boundary box screening method of the present invention.

It is to be noted that the above contents are further detailed description of the present invention in connection with the disclosed embodiments. The invention is not limited to the embodiments referred to, but may be varied and modified by those skilled in the field without departing from the conception and scope of the present invention. The claimed scope of the present invention should be defined by the scope of the claims.

What is claimed is:

1. A method for detecting pedestrians in an image by using Gaussian penalty, wherein an initial pedestrian boundary box obtained from a detected pedestrian is screened by using a Gaussian penalty, to improve detection performance with respect to pedestrians, especially sheltered pedestrians, in the image, comprising:

Step 1) acquiring a training data set, a test data set and pedestrian labels of a pedestrian detection image;

Step 2) using the training data set for training to obtain a detection model by using a pedestrian detection method, and confidence degrees and coordinates of acquiring initial pedestrian boundary box; and Step 3) performing Gaussian penalty on the confidence degrees of the pedestrian boundary box, so as to obtain confidence degree of the pedestrian boundary box after the penalty; and obtaining final pedestrian boundary boxes by screening the pedestrian boundary boxes, thereby removing repeated boundary boxes of a single pedestrian while reserving boundary boxes of sheltered pedestrians, thereby realizing the detection of the pedestrians in the image; comprising the steps of:

Step 31) for each image, sorting the boundary boxes according to the confidence degree, and selecting the boundary box M with the highest confidence degree;

Step 32) calculating an overlap ratio $IoU(M, bbox_i)$ of each of the other boundary boxes $bbox_i$ to boundary box M by Equation 1:

$$IoU(M, bbox_i) = \frac{\text{area}(M \cap bbox_i)}{\text{area}(M \cup bbox_i)}, \quad (1)$$

in which $\text{area}(M \cap bbox_i)$ is the intersection of boundary $bbox_i$ and M, and $\text{area}(M \cup bbox_i)$ is the union of boundary box $bbox_i$ and M;

penalizing the confidence degree of the boundary box using Equation 3 to obtain a confidence degree of pedestrian boundary box after penalty:

$$S_i = \text{score}_i * e^{\frac{-IoU(M, bbox_i)^2}{\sigma}}, \quad (3)$$

in which e is the natural logarithm, $\sigma$ is the variance; $\text{score}_i$ is the confidence degree of initial boundary box; $S_i$ is the confidence degree of boundary box $bbox_i$ after penalty; and $IoU(M, bbox_i)$ is the overlap degree (ratio) of boundary box $bbox_i$ to M; and Step 33) setting a confidence degree threshold, wherein for each image, the boundary box with a confidence level after penalty higher than the set confidence threshold is taken as the final test result, thereby realizing the detection of the pedestrians in the image.

2. The method according to claim 1, wherein in Step 1) the training data set and the test data set are obtained from a pedestrian data set Caltech, wherein the training data set and the test data set are marked by a pedestrian label, and the pedestrian label adopts the coordinates of the upper left and the lower right corners of a rectangle box to indicate the position of the pedestrian in the image.

3. The method according to claim 1, wherein in Step 2), wherein the detection model of a Faster Region-based convolutional neural network (RCNN) is used for training, and the image of the training data set is used to fine tune the fully connected layer of Faster RCNN neural network; the training image and a ground-truth label are input into the Faster RCNN neural network, wherein a difference between the detection and labeling of a current model is fed back to the network model using the back propagation algorithm, and the parameters of the network model are adjusted; after multiple iterations on the training data set, the pedestrian detection model is obtained; and the test data set is input into the pedestrian's detection model, and the pedestrian's position is classified and located, thus acquiring initial pedestrian boundary box and confidence degrees and coordinates thereof.

4. The method according to claim 1, wherein in Step 33) the confidence degree threshold is set as 0.5.

5. The method according to claim 1, wherein categories of said initial pedestrian boundary box obtained in Step 2) include: boundary box with no overlapping between pedestrian boundary boxes, a single pedestrian boundary box, and boundary boxes of sheltered pedestrians.

* * * * *